(12) United States Patent
Recouvreur et al.

(10) Patent No.: US 8,490,601 B2
(45) Date of Patent: Jul. 23, 2013

(54) METHOD FOR ESTIMATING THE TEMPERATURE OF A GAS PRESSURE SENSOR ATTACHED TO A WALL OF A DIESEL ENGINE AND USE OF ONE SUCH METHOD

(75) Inventors: Philippe Recouvreur, Montrouge (FR); Olivier Tigrine, Boutigny sur Essonne (FR)

(73) Assignee: Renault S.A.S., Boulogne Billancourt (FR)

( * ) Notice: Subject to any disclaimer, the term of this patent is extended or adjusted under 35 U.S.C. 154(b) by 742 days.

(21) Appl. No.: 12/678,859

(22) PCT Filed: Jul. 25, 2008

(86) PCT No.: PCT/FR2008/051409
§ 371 (c)(1),
(2), (4) Date: May 12, 2010

(87) PCT Pub. No.: WO2009/037408
PCT Pub. Date: Mar. 26, 2009

(65) Prior Publication Data
US 2010/0222987 A1 Sep. 2, 2010

(30) Foreign Application Priority Data
Sep. 19, 2007 (FR) .................................... 07 06575

(51) Int. Cl.
*F02M 51/00* (2006.01)
(52) U.S. Cl.
USPC ........ 123/479; 123/494; 701/115; 73/114.37; 702/99; 702/104

(58) Field of Classification Search
USPC ................... 123/568.22, 479, 494; 701/108, 701/115; 73/114.37; 702/98, 99, 104
See application file for complete search history.

(56) References Cited

U.S. PATENT DOCUMENTS

| | | | | |
|---|---|---|---|---|
| 5,349,936 | A * | 9/1994 | Uchinami | 123/676 |
| 5,635,633 | A * | 6/1997 | Kadota | 73/114.74 |
| 5,808,189 | A * | 9/1998 | Toyoda | 73/114.37 |
| 5,964,820 | A | 10/1999 | Miwa et al. | |
| 6,035,835 | A * | 3/2000 | Shigihama et al. | 123/568.16 |
| 6,751,567 | B2 * | 6/2004 | Farmer et al. | 702/99 |
| 7,163,007 | B2 * | 1/2007 | Sasaki et al. | 123/673 |
| 7,562,649 | B2 * | 7/2009 | Sarlashkar et al. | 123/478 |
| 8,285,496 | B2 * | 10/2012 | Heinkele et al. | 702/47 |
| 8,401,762 | B2 * | 3/2013 | Asano et al. | 701/102 |
| 2002/0173899 | A1 | 11/2002 | Miller | |
| 2003/0114978 | A1 | 6/2003 | Rimnac et al. | |
| 2005/0114011 | A1 * | 5/2005 | Itoyama | 701/108 |
| 2011/0238351 | A1 * | 9/2011 | Djelassi | 702/99 |
| 2012/0130622 | A1 * | 5/2012 | Yamada | 701/104 |
| 2012/0137675 | A1 * | 6/2012 | Ito | 60/602 |
| 2012/0285161 | A1 * | 11/2012 | Kerns et al. | 60/598 |

FOREIGN PATENT DOCUMENTS

GB  2 319 361  5/1998

\* cited by examiner

*Primary Examiner* — Thomas Moulis
(74) *Attorney, Agent, or Firm* — Oblon, Spivak, McClelland, Maier & Neustadt, L.L.P.

(57) ABSTRACT

The invention relates to a method for estimating the temperature of a gas pressure sensor attached to a wall of a turbocharged motor vehicle diesel engine, said sensor being positioned upstream of the turbine of the turbocharger. According to the invention, the temperature of the gas pressure sensor is estimated at least by measuring the temperature of the external air and the temperature of the wall to which the sensor is attached.

6 Claims, 1 Drawing Sheet

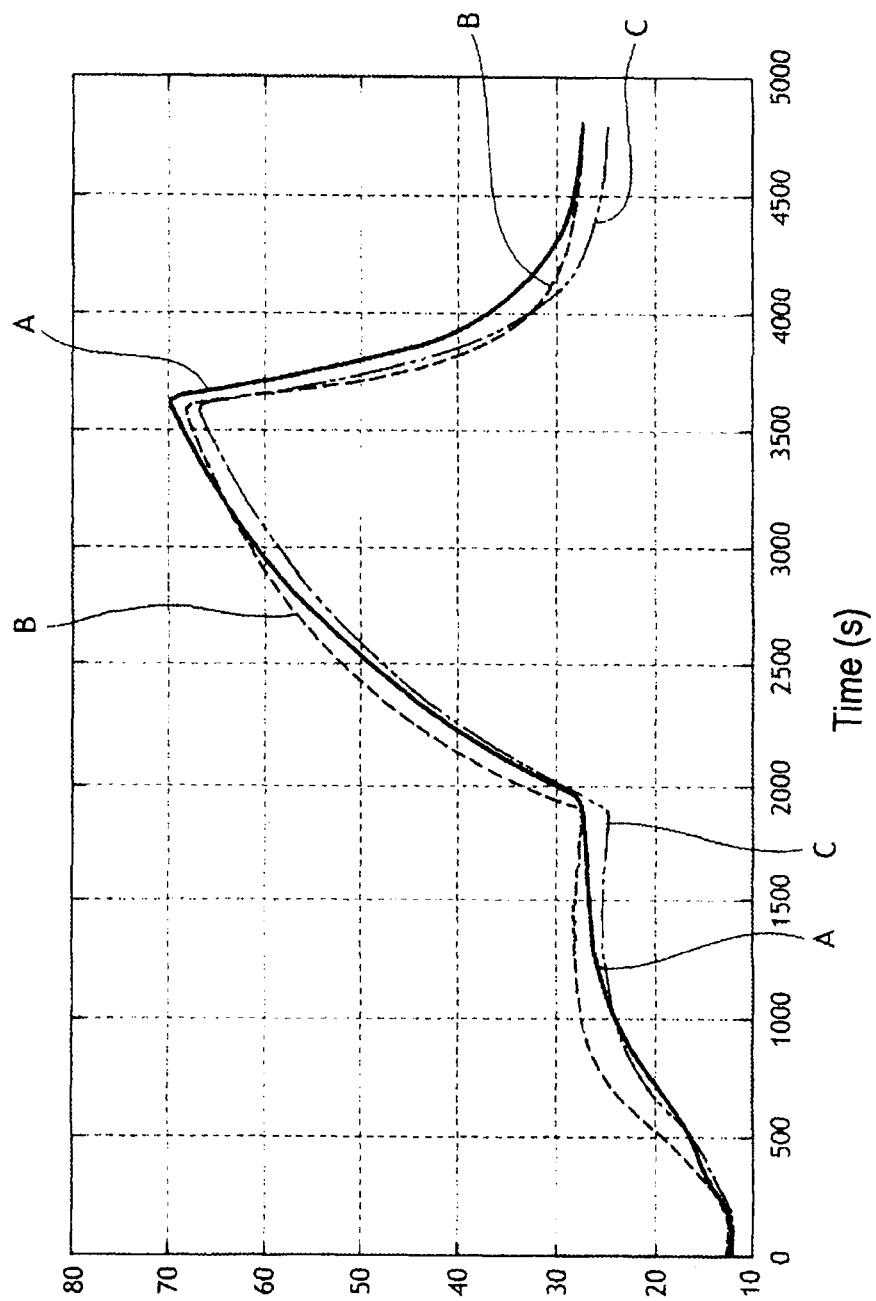

METHOD FOR ESTIMATING THE TEMPERATURE OF A GAS PRESSURE SENSOR ATTACHED TO A WALL OF A DIESEL ENGINE AND USE OF ONE SUCH METHOD

The present invention relates to a method for estimating the temperature of a gas pressure sensor attached to a wall of a motor vehicle diesel engine.

It also covers the use of such a method for determining the pre-turbine gas pressure of a motor vehicle diesel engine supercharged by a turbocharger.

A turbocharger consists of a turbine and a compressor, designed to increase the quantity of air admitted into the engine. The turbine is placed at the output of the exhaust manifold and is driven by the exhaust gases.

The power imparted by the exhaust gases can be modulated by means of a discharge valve (turbocompressor with fixed geometry, abbreviated "TGF") or fins (turbo with variable geometry, abbreviated "TGV").

The compressor is mounted on the same axis as the turbine. It compresses the air that enters into the inlet manifold. A heat exchanger can be placed between the compressor and the inlet manifold to cool the air leaving the compressor.

An actuator is used to control the opening and closing of the valve or fins. The control signal for the actuator is supplied by a computer called UCE (electronic control unit) and makes it possible to servocontrol the pressure in the inlet manifold. The pressure setpoint in the manifold is calculated by the UCE. The pressure in the inlet manifold is measured via a sensor placed on this manifold.

The information relating to the pre-turbine pressure (abbreviated "Pavt") assumes great importance for the control of diesel engines with variable geometry turbine.

This information can be used in three distinct ways:
improving the supercharging response time;
precisely calculating engine pumping losses, which makes it possible to make the torque structure more robust. The torque structure is the calculation of the actual torque of the engine (produced torque minus the torques consumed by the various peripheral devices such as alternator, air conditioning compressor, etc.) which makes it possible to ensure even operation of the engine;
guaranteeing the reliability of components of the engine subject to the stress of the pre-turbine pressure (exhaust valves, turbo actuator, etc.).

It is vitally important for the control of the engine to be able to ensure the correct operation of a pre-turbine pressure sensor and accurately determine the correct operating bands of the latter.

The exhaust gases consist, among other things, of water in gaseous form. When the engine is cut, the walls of the exhaust line cool down. The water contained in the exhaust gases condenses on the walls.

Water can thus condense at the level of the Pavt sensor.

In certain operating conditions (ambient air temperature, vehicle speed, etc.), this liquid water can freeze at the level of the sensor. The pressure indicated by the sensor is then wrong.

It has already been proposed to inhibit the information delivered by the Pavt sensor when the temperature of the ambient air is less than 0° C. (potential risk of freezing). The engine is then said to be operating in degraded mode.

This strategy is extremely restrictive since the sensor is not necessarily frozen when the temperature of the ambient air is below 0° C.

It is necessary to perfect a freezing criterion for the Pavt sensor in order to extend the sensor's operating range to the maximum. The document WO-A-2005/08519 illustrates one such method.

An additional method consists in maximizing the prevention of the freezing of the Pavt sensor by positioning the latter in places under the engine lid that are thermally stable (that is to say with low or perfectly controlled temperature variations). Thus, one competing motor vehicle constructor proposes positioning the sensor on the cooling circuit of the EGR circuit (therefore with a thermal close to the temperature of the water of the cooling circuit, entirely controlled and regulated).

This method presents the advantage of being thermally stable, but it does present a drawback, namely that there is no degree of freedom as to the positioning of the sensor.

The present invention aims to overcome the drawbacks of the abovementioned techniques by directly proposing a technique for estimating the temperature of the Pavt sensor, so as to allow for the use of this sensor even when the ambient temperature is negative and its own temperature is above 0° C.

The present invention therefore relates to a method for estimating the temperature of a gas pressure sensor attached to a wall of a motor vehicle diesel engine supercharged by a turbocharger, this sensor being positioned upstream of the turbine of said turbocharger.

This method is noteworthy in that said estimation is made at least from the measurement of the temperature of the outside air and from the temperature of the wall to which said sensor is attached.

According to other advantageous and nonlimiting characteristics of this method:
said estimation is made from the relation:

$$\frac{dT_{sensor}}{dt} = \frac{1}{\tau} \cdot [(1-\varepsilon) \cdot T_{water} + \varepsilon \cdot T_{air} + \Delta T_{exhaust}]$$

in which:

$\frac{dT_{sensor}}{dt}$ = variation of the temperature of the sensor as a function of time;

$T_{water}$=temperature of the engine cooling water;
$T_{air}$=temperature of the outside air;

$$\varepsilon = \frac{K_1 \cdot speed^n}{K_1 \cdot speed^n + 1}$$

$$\tau = \frac{K_2}{K_1 \cdot speed^n + 1}$$

$\Delta T_{exhaust}$=variation of the temperature of the associated exhaust line $K_3 \cdot \tau \cdot (Tp_{exhaust}^4 - T_{water}^4)$ where $Tp_{exhaust}$ is the temperature of the wall of the exhaust line,
K1, K2, K3 and n being constants specific to said vehicle, while "speed" is the speed of movement of said vehicle.

In one embodiment, the variable $\Delta T_{exhaust}$ is disregarded.

In a variant, the variable $Tp_{exhaust}$ is determined using a sensor.

According to yet another variant, the variable $Tp_{exhaust}$ is determined from a computer model.

The invention also relates to the use of the method as defined hereinabove for determining the pre-turbine gas pressure of a motor vehicle diesel engine supercharged by a turbocharger, characterized in that the pressure information delivered by said sensor is inhibited when its estimated temperature is equal to or less than 0° C.

Other characteristics and benefits of the present invention will become apparent from reading the following description of a preferential embodiment.

This description is given with reference to the appended FIG. 1 which illustrates, as a function of time, the temperature of a Pavt sensor, from a real measurement and two estimations.

The main objective of the present invention is to be able to provide useful information on the temperature of the Pavt sensor.

The principle is to analyze the thermal phenomena that affect the pre-turbine pressure sensor and propose a trend model of its temperature.

The Pavt sensor is in equilibrium between:
- the temperature of the outside air (through the speed of the vehicle);
- the temperature of the body (wall) to which the sensor is attached (often a temperature close to the temperature of the water leaving the engine).

Depending on the placement of the sensor, an additional heat source is considered. This source is generally a source originating from the exhaust line (because of the nature of the sensor that measures the pressure before the turbine).

The modeling of the heat exchanges relies on thermal equations that make an analogy with electricity.

From this analogy, the parameters involved are as follows:
- the convection coefficient of the air entering under the lid: hS, linked to the speed of the vehicle
- the coefficient of conduction with the walls of the engine: Gc, linked to the contact between the sensor and the sensor's attachment wall
- the power radiated by the exhaust ($P_{exhaust}$) linked to the temperature of the exhaust line.

The equation governing the temperature of the sensor is as follows:

$$MCp_{sensor}\frac{dT_{sensor}}{dt} = hS(T_{air}\ T_{sensor}) + Gc(T_{water}\ T_{sensor}) + P_{exhaust}$$ (Equation 1)

Each of these terms is explained below.

1. The Convective Exchanges Between the Outside Air and the Sensor: hS

The convective exchanges are described macroscopically by an exchange coefficient h. This coefficient is obtained by using an empirical relation linking 3 dimensionless coefficients: the number of Nusselt (Nu), the number of Reynolds (Re) and the number of Prandtl (Pr).

$$Nu = f(Re^n, Pr)$$

In the first order:
- the number of Reynolds is a function of the flow rate of cool air entering into the engine compartment, which is directly linked to the vehicle speed;

$$Re = f(\text{vehicle\_speed}^n)$$

- the number of Prandtl is constant. For air:

$$Pr \approx 0.7$$

the number of Nusselt is equal to:

$$Nu = \frac{h \cdot L_{characteristic}}{\lambda}$$

with
$\lambda = 0.021$ W/m·K for air
$L_{characteristic}$ = constant (linked to the geometry of the sensor)

It is deduced therefrom that $hS = f(\text{vehicle\_speed}^n) = C_1 \cdot \text{vehicle\_speed}^n$ With $C_1$ and n: constants to be identified on each type of vehicle by tests.

2. The Conductive Exchanges Between the Outside Air and the Sensor: Gc

The conductive exchanges are described by a constant conductance Gc that is constant.

$$Gc = C_2$$

With $C_2$ = constant to be identified on each type of vehicle by tests.

3. The Power Radiated by the Exhaust: $P_{exhaust}$

This power is directly linked to the wall temperature of the exhaust line ($T_{exhaust}$) and is expressed:

$$P_{exhaust} = \delta \cdot \sigma \cdot S \cdot (Tp_{exhaust}^4\ Tp_{sensor}^4) \cdot f_{sensor \to exhaust}$$

with
$\epsilon$: emissivity of the sensor (close to 1),
S: surface area of the sensor
$\sigma$: Boltzmann's constant ($5.67 \cdot 10^{-8}$ W/m²·K⁴),
T is expressed in degrees Kelvin,
$f_{sensor \to exhaust}$: form factor which is the fraction of the energy emitted by the sensor and received by the exhaust line. This factor is purely geometrical and is a constant for a given vehicle.

For a given sensor: $\epsilon \cdot \sigma \cdot S \cdot f_{sensor \to exhaust} = C_4$ (constant).

4. The Inertia of the Sensor:

$$MCp_{sensor}\frac{dT_{sensor}}{dt}$$

This term represents the inertia of the sensor.

$Cp_{sensor}$ is the specific heat of the sensor which is a constant for a given sensor.

M is the mass of the sensor.

For a given sensor, $M \cdot Cp_{sensor} = C_3$ is a constant.

$$\frac{dT_{sensor}}{dt}$$

is the temperature variation of the sensor as a function of time.

We now introduce the concept of effectiveness:

$$\varepsilon = \frac{T_{water}\ T_{sensor}}{T_{water}\ T_{air}}$$

We are seeking a simple equation that describes the trend of the temperature of the sensor in the form:

$$\frac{dT_{sensor}}{dt} = \frac{1}{\tau} \cdot [(1-\varepsilon) \cdot T_{water} + \varepsilon T_{air} + \Delta T_{exhaust}] \quad \text{(Equation 2)}$$

where τ is the time constant of the equation 2.
By identifying the equations 1 and 2, it becomes:

$$\varepsilon = \frac{hS}{hS + Gc},$$

$$\tau = \frac{MCp}{hS + Gc}$$

and $$\Delta T_{exhaust} = \frac{P_{exhaust} \cdot \tau}{M \cdot Cp}$$

Now, we have seen previously:
$hS = C_1 \cdot \text{vehicle\_speed}^n$
$Gc = C_2$,
$MCp = C_3$,
$\varepsilon \cdot \sigma \cdot S \cdot f_{sensor \rightarrow exhaust} = C_4$
Let us assume:

$$K_1 = \frac{C_1}{C_2},$$

$$K_2 = \frac{C_3}{C_2}$$

and $$K_3 = \frac{C_4}{C_3}$$

It then follows that $$\varepsilon = \frac{K_1 \text{ speed}^n}{K_1 \text{ speed}^n + 1} \tau = \frac{K_2}{K_1 \text{ speed}^n + 1} \Delta T_{exhaust} = K_3 \tau (Tp_{exhaust}^4 - T_{water}^4)$$

By identifying the constants K1, K2, K3 and n on a vehicle we can describe the trend of the temperature of the sensor:

$$\frac{dT_{sensor}}{dt} = \frac{1}{\tau} \cdot [(1-\varepsilon) \cdot T_{water} + \varepsilon T_{air} + \Delta T_{exhaust}]$$

The term $\Delta T_{exhaust}$ requires knowledge of the temperature of the exhaust line $Tp_{exhaust}$. It is possible to consider measuring this temperature with a sensor or estimating it by a model. The creation of an additional model can be envisaged but it does increase the complexity of the initial temperature model of the Pavt sensor. Now, it is preferable for this model to remain simple to be incorporated in the software for an engine.

Let us assume that the thermal power radiated by the exhaust increases the temperature of the sensor. In practice, the exhaust is the hottest component of the engine compartment. Disregarding this power therefore means underestimating the temperature of the Pavt sensor. This is not a problem inasmuch as the main application of the Pavt sensor temperature estimator is to diagnose freezing. When the estimator indicates a temperature above 0° C., it is certain that the sensor is not frozen.

In a preferential embodiment, it may therefore be decided to deliberately disregard the term $\Delta T_{exhaust}$ (equivalent to a zero $K_3$) and ultimately resolve the following system:

$$\frac{dT_{sensor}}{dt} = \frac{1}{\tau}[(1-\varepsilon)T_{water} + \varepsilon T_{air}] \quad \text{(Equation 3)}$$

with $$\varepsilon = \frac{K_1 \cdot \text{speed}^n}{K_1 \cdot \text{speed}^n + 1}$$

$$\tau = \frac{K_2}{K_1 \cdot \text{speed}^n + 1}$$

and

K1, K2, K3 and n: constants to be identified on the vehicle.

The choice of a model that does not take account of the thermal power of the exhaust thus offers a simpler solution, while being effective and easy to implant in software.

The appended FIG. 1 shows temperature variation curves of a Pavt sensor as a function of time.

The curve A corresponds to a direct measurement of the temperature of said sensor. The curve B is an estimation curve established in accordance with this method, by taking account of the power radiated by the exhaust (equation 2). Finally, the curve C is an estimation curve established in accordance with this method, without taking account of the power radiated by the exhaust (equation 3).

It therefore emerges from these curves that the present method gives results that are satisfactory and easy to implant in the UCE. It is reliable and easy to calibrate for all the engine applications (for this, it is sufficient to re-identify the constants K1, K2, K3 and n defined previously).

The present method presents a number of advantages:

The use of the Pavt sensor and the associated strategies can be extended to negative ambient temperatures as long as the temperature of the sensor is above 0° C.

The thermal equations governing the thermal behavior of the sensor do not require high sampling frequencies. This type of model therefore uses little of the computation time by the UCE. It can thus be easily implanted in software.

It is simple in its operation, such that it can be used for all the vehicle applications.

Estimating the temperature of the sensor allows freedom in positioning the sensor in the vehicle.

The sensor's temperature information is additional information on the quality of the Pavt information. It is possible to envisage corrections to the dispersions or drifts of the Pavt information as a function of the temperature. It is now no longer simply a matter of diagnosing the sensor (frozen or unfrozen) but also of correcting the information.

In order to retain a simple model structure, it is necessary to impose the temperature of the ambient air on starting the engine. This is the lowest temperature of the system. The concept of "underestimation" of the temperature is thus still retained which makes it possible to diagnose the freezing of the sensor.

The present method can be applied for all the thermally inert components (that is to say components that do not give off energy). It is sufficient to then adapt the equations proposed previously through the coefficients (K1, K2, K3 and n) according to the positioning of the component concerned.

The invention claimed is:

1. A method for estimating the temperature of a gas pressure sensor attached to a wall of a motor vehicle diesel engine supercharged by a turbocharger, this sensor being positioned upstream of the turbine of said turbocharger, characterized in that said estimation is made at least from the measurement of the temperature of the outside air and from the temperature of the wall to which said sensor is attached.

2. The method as claimed in claim 1, characterized in that said estimation is made from the relation:

$$\frac{dT_{sensor}}{dt} = \frac{1}{\tau} \cdot [(1-\varepsilon) \cdot T_{water} + \varepsilon \cdot T_{air} + \Delta T_{exhaust}]$$

in which:

$\frac{dT_{sensor}}{dt}$ = variation of the temperature of the sensor as a function of time;

$T_{water}$=temperature of the engine cooling water;

$T_{air}$=temperature of the outside air;

$$\varepsilon = \frac{K_1 \cdot \text{speed}^n}{K_1 \cdot \text{speed}^n + 1}$$

$$\tau = \frac{K_2}{K_1 \cdot \text{speed}^n + 1}$$

$\Delta T_{exhaust}$=variation of the temperature of the associated exhaust line=$K_3 \cdot \tau \cdot (Tp_{exhaust}^4 - T_{water}^4)$ where $Tp_{exhaust}$ is the temperature of the wall of the exhaust line, K1, K2, K3 and n being constants specific to said vehicle, while "speed" is the speed of movement of said vehicle.

3. The method as claimed in claim 2, characterized in that the variable $\Delta T_{exhaust}$ is disregarded.

4. The method as claimed in claim 2, characterized in that the variable $Tp_{exhaust}$ is determined using a sensor.

5. The method as claimed in claim 2, characterized in that the variable $Tp_{exhaust}$ is determined from a computer model.

6. The use of the method as claimed in one of claims 1 to 5 for determining the pre-turbine gas pressure of a motor vehicle diesel engine supercharged by a turbocharger, characterized in that the pressure information delivered by said sensor is inhibited when its estimated temperature is equal to or less than 0° C.

* * * * *